US012752498B2

(12) United States Patent
Rosenbrock

(10) Patent No.: US 12,752,498 B2
(45) Date of Patent: Oct. 6, 2026

(54) CLAMSHELL SHAPE FORMING SYSTEMS AND METHODS

(71) Applicant: Goodrich Corporation, Charlotte, NC (US)

(72) Inventor: Kyle Rosenbrock, Pueblo, CO (US)

(73) Assignee: Goodrich Corporation, Charlotte, NC (US)

( * ) Notice: Subject to any disclaimer, the term of this patent is extended or adjusted under 35 U.S.C. 154(b) by 171 days.

(21) Appl. No.: 18/623,884

(22) Filed: Apr. 1, 2024

(65) Prior Publication Data

US 2025/0303651 A1 Oct. 2, 2025

(51) Int. Cl.

| | |
|---|---|
| ***B29C 70/46*** | (2006.01) |
| ***B29C 33/26*** | (2006.01) |
| ***B29C 33/42*** | (2006.01) |
| ***B29K 233/20*** | (2006.01) |

(52) U.S. Cl.

CPC .............. *B29C 70/46* (2013.01); *B29C 33/26* (2013.01); *B29C 33/42* (2013.01); *B29K 2233/20* (2013.01)

(58) Field of Classification Search

CPC ....... B29C 33/26; B29C 33/42; B29C 70/345; B29C 70/46; Y10T 428/24694

See application file for complete search history.

(56) References Cited

U.S. PATENT DOCUMENTS

| | | | | |
|---|---|---|---|---|
| 3,205,791 | A * | 9/1965 | Goodfellow | A24D 3/18 493/41 |
| 8,770,966 | B2 | 7/2014 | Schibsbye | |
| 11,104,032 | B2 | 8/2021 | White et al. | |
| 2002/0139164 | A1* | 10/2002 | Ishihara | B29D 30/0606 425/46 |
| 2012/0192733 | A1* | 8/2012 | Angevine | B44B 5/026 101/26 |
| 2019/0359781 | A1* | 11/2019 | Nomura | B29C 70/46 |
| 2020/0375317 | A1* | 12/2020 | Meir | A43B 23/025 |
| 2022/0402828 | A1 | 12/2022 | Linck et al. | |

* cited by examiner

*Primary Examiner* — Jerzi H Moreno Hernandez

(74) *Attorney, Agent, or Firm* — SNELL & WILMER L.L.P.

(57) ABSTRACT

A method for shape forming a composite part includes positioning an oxidized PAN fiber preform between a first forming mold and a second forming mold. The first forming mold is pivotally coupled to the second forming mold such that rotating the first forming mold toward the second forming mold compresses the preform therebetween. The method can further include forming the preform into a shaped body first as the first forming mold is rotated toward the second forming mold. As the first forming mold rotates toward the second forming mold, a compressing force can first clamp a first side of the preform in place, and then the compressing force progresses along the preform from a first side of the preform, located at the hinge side of the first forming mold, toward a second side of the preform, located at a free side of the first forming mold.

20 Claims, 9 Drawing Sheets

CLAMSHELL SHAPE FORMING SYSTEMS AND METHODS

FIELD

The present disclosure relates to carbon/carbon composites, and more specifically, to systems and methods for shape-forming fibrous preforms during manufacturing of carbon/carbon (C/C) composites.

BACKGROUND

Composite bodies are utilized in various industries, including the aerospace industry. C/C composites are often produced as 2D structures, for example utilizing planar oxidized polyacrylonitrile (PAN) fiber-based preforms followed by carbonization and chemical vapor infiltration (CVI) densification. The 2D structures can be formed using a tooling assembly that typically includes an upper die that moves linearly with respect a lower die to compress the preform therebetween. These preforms are subject to tearing and/or wrinkling when attempts are made to form a 2D preform "sheet" into a more complex geometry.

SUMMARY

In general, aspects of the subject matter described in this disclosure may be embodied in a method for shape forming a composite part. The method includes positioning a fiber preform between a first forming mold and a second forming mold, the first forming mold is pivotally coupled to the second forming mold. The method further includes rotating the first forming mold toward the second forming mold to compress the fiber preform therebetween. The method further includes forming the fiber preform into a shaped body as the first forming mold is rotated toward the second forming mold.

These and other embodiments may optionally include one or more of the following features.

In various embodiments, the first forming mold is mounted to the second forming mold via a hinge.

In various embodiments, the first forming mold progressively applies pressure to the fiber preform from a first end of the fiber preform toward a second end of the fiber preform as the first forming mold rotates toward the second forming mold.

In various embodiments, the method further includes heating the fiber preform for a predetermined duration. The heat can be applied while the fiber preform is held in compression between the first forming mold and the second forming mold. The fiber preform can be preheated. The fiber preform can be heated during the forming.

In various embodiments, in response to rotating the first forming mold toward the second forming mold a hinge side of the first forming mold clamps a first side of the fiber preform to a hinge side of the second forming mold, and a free side of the first forming mold pushes a second side of the fiber preform to bend around a radii surface of the second forming mold. In various embodiments, in response to the free side of the first forming mold pushing the second side of the fiber preform to bend around the radii surface of the second forming mold, the second side of the fiber preform is pushed into a groove disposed in the second forming mold. In various embodiments, the radii surface extends from a free side of the second forming mold toward a hinge side of the second forming mold.

In various embodiments, the first forming mold and the second forming mold are in direct contact with the fiber preform.

In various embodiments, the method further includes applying a force to a free side of the first forming mold with a platen press to hold the shaped body in compression between the first forming mold and the second forming mold, and applying a heat to the shaped body for a predetermined duration.

In various embodiments, the fiber preform is a needled oxidized PAN fiber preform.

In another aspect, a shape forming fixture for a composite part is disclosed. The shape forming fixture includes a first forming mold, a second forming mold, and a hinge, whereby the first forming mold is pivotally coupled to the second forming mold. The first forming mold is configured to rotate toward the second forming mold to compress a fiber preform therebetween for shape forming the fiber preform into a shaped body.

These and other embodiments may optionally include one or more of the following features.

In various embodiments, the shape forming fixture further includes a first plurality of undulations defining a first contact surface of the first forming mold. In various embodiments, the shape forming fixture further includes a second plurality of undulations defining a second contact surface of the second forming mold, the second plurality of undulations are configured to interlock with the first plurality of undulations. In various embodiments, the first plurality of undulations converge toward a hinge side of the first forming mold. In various embodiments, the second plurality of undulations converge toward a hinge side of the second forming mold. In various embodiments, the first plurality of undulations extend from a free side of the first forming mold. In various embodiments, the second plurality of undulations extend from a free side of the second forming mold.

In various embodiments, the shape forming fixture further includes a convex feature disposed on an outer surface of the first forming mold, opposite the first contact surface, and located at the free side of the first forming mold, and the convex feature is configured to transfer a compressing force into the first forming mold to compress the fiber preform between the first forming mold and the second forming mold. In various embodiments, the convex feature is a hemispherical body protruding from the outer surface of the first forming mold. In various embodiments, the convex feature is a rounded rod extending substantially parallel to a hinge line of the hinge.

In another aspect, a method for shape forming a composite part is disclosed. The method includes positioning a fiber preform between a first forming mold and a second forming mold, the first forming mold is pivotally coupled to the second forming mold. The method further includes rotating the first forming mold toward the second forming mold to compress the fiber preform therebetween. The method can further include, as the first forming mold is rotating toward the second forming mold, clamping a first end of the fiber preform between a hinge side of the first forming mold and a hinge side of the second forming mold. The method can further include, with the first end of the fiber preform clamped between the hinge side of the first forming mold and the hinge side of the second forming mold, and as the first forming mold is rotating toward the second forming mold, moving an elongated protrusion of the first forming mold into an elongated groove of the second forming mold. The method can further include bending the fiber preform with the elongated protrusion to conform to a profile of the second forming mold. The method can further include forming the fiber preform into a shaped body as the first forming mold is rotated toward the second forming mold.

These and other embodiments may optionally include one or more of the following features.

In various embodiments, the rotating the first forming mold toward the second forming mold to compress the fiber preform therebetween includes progressively applying a compressing force to the fiber preform from a first side of the fiber preform, located at the hinge side of the first forming mold, toward a second side of the fiber preform, located at a free side of the first forming mold.

The foregoing features and elements may be combined in various combinations without exclusivity, unless expressly indicated herein otherwise. These features and elements as well as the operation of the disclosed embodiments will become more apparent in light of the following description and accompanying drawings.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A shape forming fixture of the present disclosure includes a first forming mold or die that is pivotally attached to a second forming mold or die. As the first forming mold rotates toward the second forming mold, the first forming mold can first compress a periphery of a fiber preform located at a hinge side of the fixture. As the first forming mold continues to rotate, it contacts and moves the fiber preform into one or more recesses in the second forming mold in a progressive manner from the hinge side of the fixture to a free side of the fixture. In this manner, wrinkling of the fiber preform is mitigated and/or eliminated.

Particular embodiments of the subject matter described in this disclosure may be implemented to realize one or more of the following advantages. A pivoting shape forming fixture can be used to form composite parts having complex geometries. The pivoting shape forming fixture mitigates and/or eliminates wrinkling and/or tearing of the fiber preform during a shape forming process.

Figure 1B:
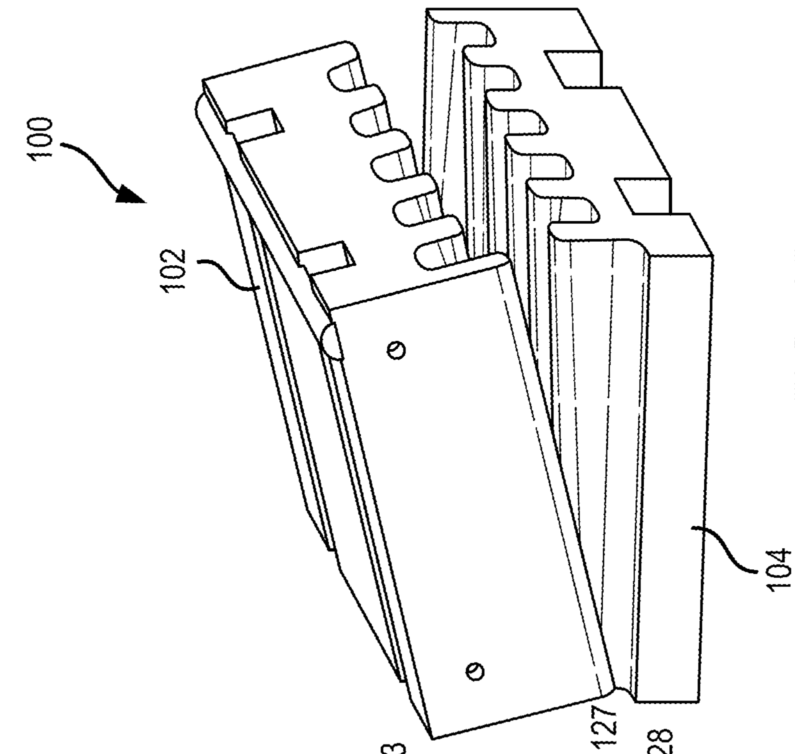
FIG. 1A, FIG. 1B, and FIG. 1C are perspective illustrations of a shape forming fixture in an open position, a partially closed position, and a closed position, respectively, in accordance with various embodiments.
Figure 1A:
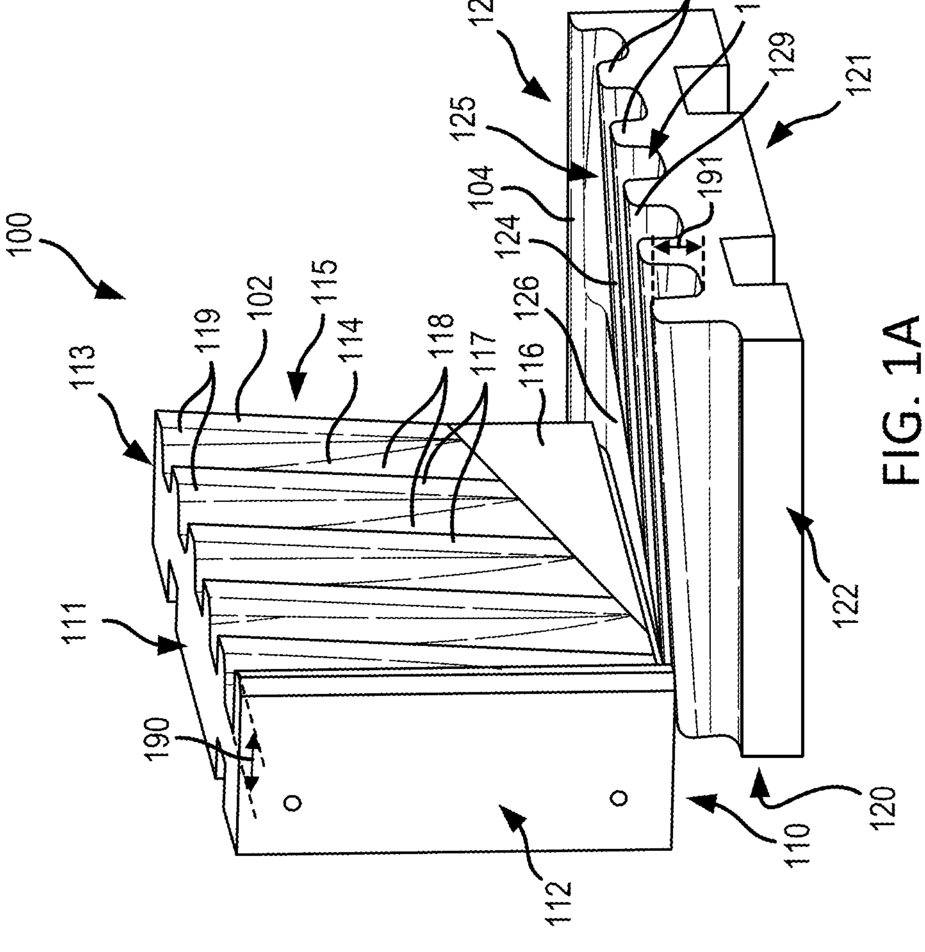
Figure 1C:
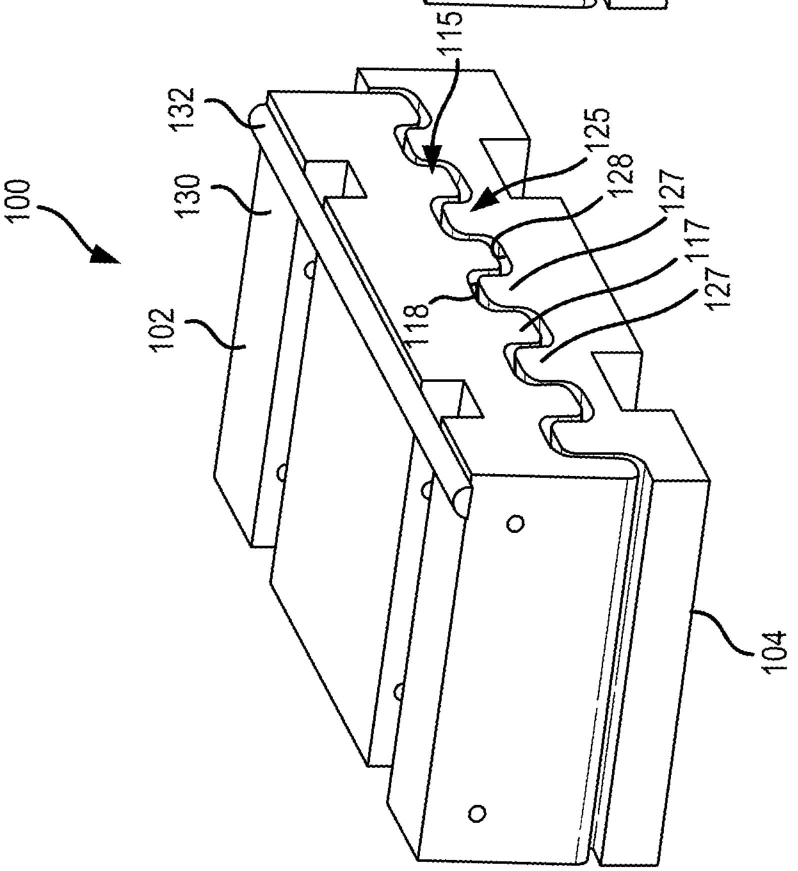

With reference to FIG. 1A, FIG. 1B, and FIG. 1C, a shape forming fixture 100 in an open position, a partially closed position, and a closed position, respectively, is illustrated, in accordance with various embodiments. The shape forming fixture 100 can include a first forming mold 102 and a second forming mold 104. The first forming mold 102 is pivotally coupled to the second forming mold 104. The first forming mold 102 can be pivotally coupled to the second forming mold 104 to form a clamshell-like shape forming system. The first forming mold 102 is configured to pivot or rotate toward the second forming mold 104 to compress a fiber preform therebetween for shape forming the fiber preform into a shaped body. In various embodiments, the first forming mold 102 is a top mold and the second forming mold 104 is a bottom mold.

The first forming mold 102 can include a hinge side 110 and a free side 111. The hinge side 110 and the free side 111 are disposed at opposite sides of the first forming mold 102. The first forming mold 102 can include a first end 112 and a second end 113. The first end 112 and the second end 113 are disposed at opposite ends of the first forming mold 102. The first end 112 and the second end 113 can extend between and to the hinge side 110 and the free side 111. The hinge side 110 and the free side 111 can extend between and to the first end 112 and the second end 113.

The first forming mold 102 can include a contact surface 114 configured to contact the fiber preform during the shape forming process. The contact surface 114 can define a plurality of undulations 115 (also referred to herein as a first plurality of undulations). The undulations 115 can extend from the free side 111 toward the hinge side 110. In various embodiments, the undulations 115 converge toward the hinge side 110. Stated differently, a depth 190 of the undulations 115 can decrease from the free side 111 toward the hinge side 110. In various embodiments, the depth 190 of the undulations 115 is greater at the free side 111 than at the hinge side 110. In various embodiments, the depth 190 monotonically decreases from the free side 111 toward the hinge side 110. In various embodiments, the contact surface 114 defines a flat surface 116 disposed between the hinge side 110 and the undulations 115.

The undulations 115 can define one or more elongated protrusions 117 and one or more elongated grooves 118. Each of the elongated grooves 118 can be interposed between adjacent elongated protrusions 117. The elongated protrusions 117 and the elongated grooves 118 can extend from the free side 111 toward the hinge side 110. The undulations 115 can define one or more radii surfaces 119. The elongated protrusions 117 can define the radii surface(s) 119. The radii surface(s) 119 extend from the free side 111 of the first forming mold 102 toward the hinge side 110 of the first forming mold 102. The elongated protrusions 117 may be configured without any sharp corners or sharp transitions.

The second forming mold 104 can include a hinge side 120 and a free side 121. The hinge side 120 and the free side 121 are disposed at opposite sides of the second forming mold 104. The second forming mold 104 can include a first end 122 and a second end 123. The first end 122 and the second end 123 are disposed at opposite ends of the second forming mold 104. The first end 122 and the second end 123 can extend between and to the hinge side 120 and the free side 121. The hinge side 120 and the free side 121 can extend between and to the first end 122 and the second end 123.

The second forming mold 104 can include a contact surface 124 configured to contact the fiber preform during the shape forming process. The contact surface 124 can define a plurality of undulations 125 (also referred to herein as a second plurality of undulations). The undulations 125 can extend from the free side 121 toward the hinge side 120. In various embodiments, the undulations 125 converge toward the hinge side 120. Stated differently, a depth 191 of the undulations 125 can decrease from the free side 121 toward the hinge side 120. In various embodiments, the depth 191 of the undulations 125 is greater at the free side 121 than at the hinge side 120. In various embodiments, the depth 191 monotonically decreases from the free side 121 toward the hinge side 120. In various embodiments, the contact surface 124 defines a flat surface 126 disposed between the hinge side 120 and the undulations 125.

In addition to varying between the hinge side 120 and the free side 121, the depth 191 of the undulations 125 can vary from the first end 122 and the second end 123. For example, a first undulation 125 can have a first depth 191 which is greater than that of an adjacent undulation 125. The undulations 125 can define one or more elongated protrusions 127 and one or more elongated grooves 128. Each of the elongated grooves 128 can be interposed between adjacent elongated protrusions 127. The elongated protrusions 127 and the elongated grooves 128 can extend from the free side 121 toward the hinge side 120. The undulations 125 can define one or more radii surfaces 129. The elongated protrusions 127 can define the radii surface(s) 129. The radii surface(s) 129 extend from the free side 121 of the second forming mold 104 toward the hinge side 120 of the second forming mold 104. The elongated protrusions 127 may be configured without any sharp corners or sharp transitions.

As the first forming mold 102 rotates toward the second forming mold 104, the first plurality of undulations 115 can interlock with the second plurality of undulations 125 (see FIG. 1C). With particular focus on FIG. 1C, and with the shape forming fixture 100 in the closed position, the elongated protrusions 117 of the first forming mold 102 can be interposed between adjacent elongated protrusions of the second forming mold 104. Each elongated protrusion 117 can be received in an associated elongated groove 128 when the first forming mold 102 rotates toward the second forming mold 104. Similarly, each elongated protrusion 127 can be received in an associated elongated groove 118 when the first forming mold 102 rotates toward the second forming mold 104. As the first forming mold 102 rotates toward the second forming mold 104, the contact surface 114 of the first forming mold 102 can push the fiber preform to bend around one or more radii surface(s) 129 of the second forming mold 104 (e.g., see FIG. 5B).

Figure 2:
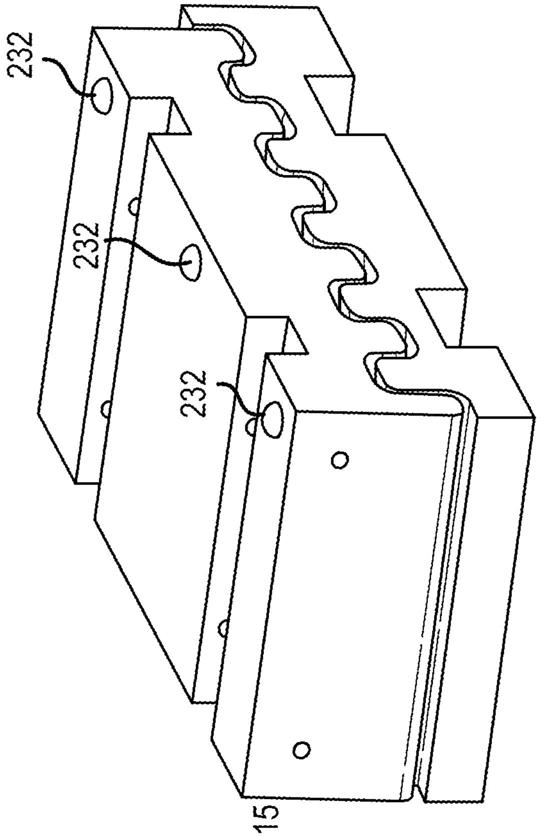
FIG. 2 is a perspective illustration of a shape forming fixture having hemispherical protrusions configured as contact points for a top forming mold of the shape forming fixture, in accordance with various embodiments.

In various embodiments, a convex feature, such as a rounded rod 132 (see FIG. 1C) or a hemispherical body 232 (see FIG. 2) for example, is disposed on an outer surface 130 of the first forming mold 102. The convex feature can protrude from the outer surface 130. In various embodiments, the rounded rod 132 has a shape akin to a cylindrical rod ripped along the length thereof thereby forming a half-cylindrical rod. In various embodiments, the hemispherical body 232 has a shape akin to a spherical body cut in half. The convex feature creates a contact point whereby a press or a dead weight can apply a compressing force to the shape forming fixture 100 to hold the fiber preform in compression during the shape forming process.

Figure 3:
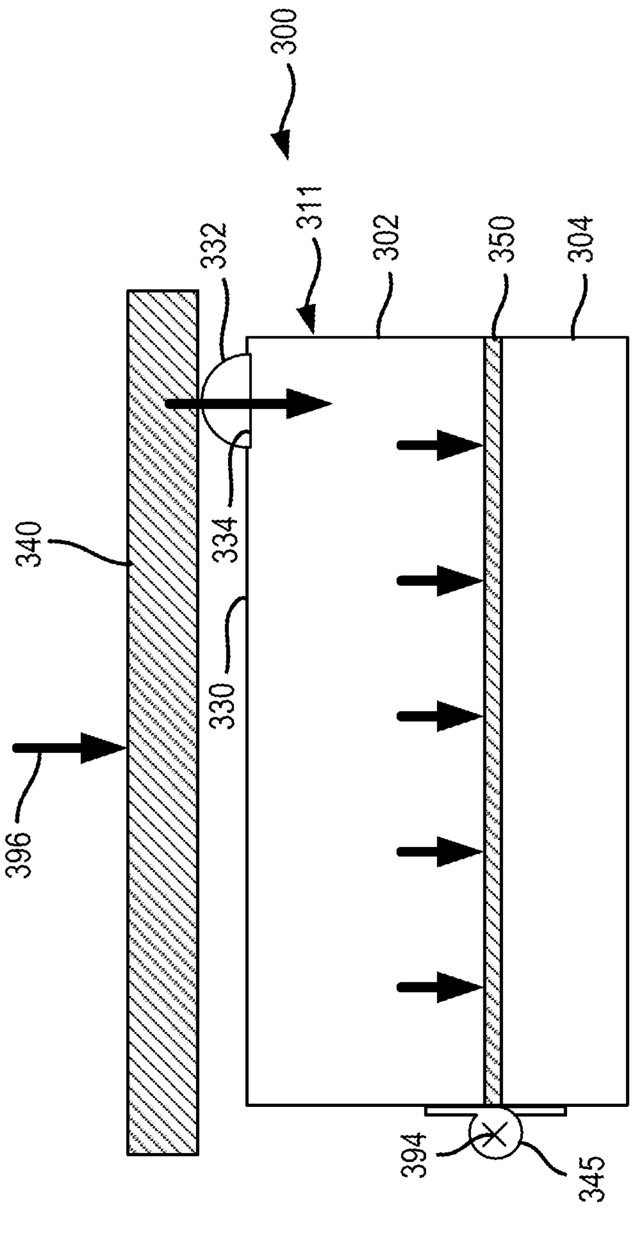
FIG. 3 is a schematic illustration of a shape forming fixture being compressed by a press, in accordance with various embodiments.

With reference to FIG. 3, a shape forming fixture 300 is illustrated in a closed position with a press 340 applying a compressing force to the shape forming fixture 300 via the convex feature 332. The shape forming fixture 300 can be similar to the shape forming fixture 100 of FIG. 1A through FIG. 1C, in accordance with various embodiments. In various embodiments, a channel 334 is disposed in the outer surface 330 of the first forming mold 302. The channel 334 can be shaped and sized to receive the convex feature 332. The channel 334 can be disposed at the free side 311 of the first forming tool 302. In various embodiments, the channel 334 extends parallel to an axis of rotation 394 (also referred to herein as a hinge line) of the first forming tool 302. The convex feature 332 can define an uppermost surface of the shape forming fixture 300 such that the press 340 remains in contact with the convex feature 352 as the first forming mold 302 rotates with respect to the second forming mold 304. In the illustrated embodiment, the first forming mold 302 is pivotally coupled to the second forming mold 304 via a hinge 345. The convex feature 332 is configured to transfer a compressing force 396 into the first forming mold 302 to compress the fiber preform 350 between the first forming mold 302 and the second forming mold 304. The first forming mold 302 and the second forming mold 304 can apply a compressing force to the fiber preform 350 that is evenly distributed along the fiber preform 350 when the shape forming fixture 300 is in the closed position.

In various embodiments, heat is added to the fiber preform 350 during the shape forming process. For example, the press 340 may be a heated press whereby heat is conducted from the press 340 into the fiber preform 350. In various embodiments, it is further contemplated that heaters, separate from the press 340, may be provided for heating the fiber preform 350 during the shape-forming process. In various embodiments, the shape forming fixture 300 may be placed in an oven or heated platen press before or during the shape forming process. In various embodiments, components of the press 340 may be heated in an oven or heated platen press prior to being introduced to the fiber preform 350, for example to a shape forming temperature of between 150° F. and 400° F. (65° C.-205° C.) in various embodiments, between 200° F. and 350° F. (93° C.-177° C.) in various embodiments, between 200° F. and 300° F. (93° C.-149° C.) in various embodiments, and between 225° F. and 275° F. (107° C.-135° C.) in various embodiments.

In various embodiments, moisture is added to the fiber preform 350 during the shape-forming process. For example, a sizing agent comprising a fluid and/or fluid vapor such as water, polyvinyl alcohol, and/or steam may be applied to the fiber preform 350 (e.g., before being shape formed). For example, steam may be applied to the fiber preform 350 for a predetermined duration while the fiber preform 350 is being formed into the shaped body and/or held in compression in the shape forming fixture 300. Adding the sizing agent (e.g., water, polyvinyl alcohol, modified starch, carboxymethyl cellulose, modified wax, acrylates, and/or steam) to the fiber preform 350 may dampen the fibers thereof which tends to relax the fibers of the fiber preform thereby aiding in the bending, forming, and/or stretching of the fiber preform. Sizing may help to protect the fiber from handling damage and provide lubricity allowing the fibers to slide easily during preforming/compaction and aid in preventing wrinkling and kinking. Sizing agents of the present disclosure include water soluble polymers. The sizing agent may comprise a water solution. The sizing agent and may comprise long chain alcohols such as polyvinyl alcohols, modified starch, cellulose gum such as carboxymethyl cellulose, modified wax, acrylates, and/or mixtures thereof. Moreover, the fiber preform may be preconditioned in a humidity chamber at a humidifying temperature (e.g., between 100° F. (37.8° C.) and 200° F. (93.3° C.)) and a relative humidity (e.g., between 75% and 90% humidity). Adding the sizing agent to the fiber preform 350 may tend to reduce wrinkling of the fiber preform 350 and support stabilizing the preform into the desired shape. In this manner, a fiber preform comprising oxidized polyacrylonitrile fiber (OPF) may be compressed to higher fiber volume ratio and formed to shape using heat, moisture, and pressure into contoured shapes using the shape forming fixture 300 and/or the press 340 as desired for a particular composite part application. In various embodiments, the fiber preform is a needled OPF fiber preform (i.e., an OPF fiber preform having undergone a Z-needling process which includes moving Z-fibers between multiple sheets or layers of OPF).

Figure 4A:
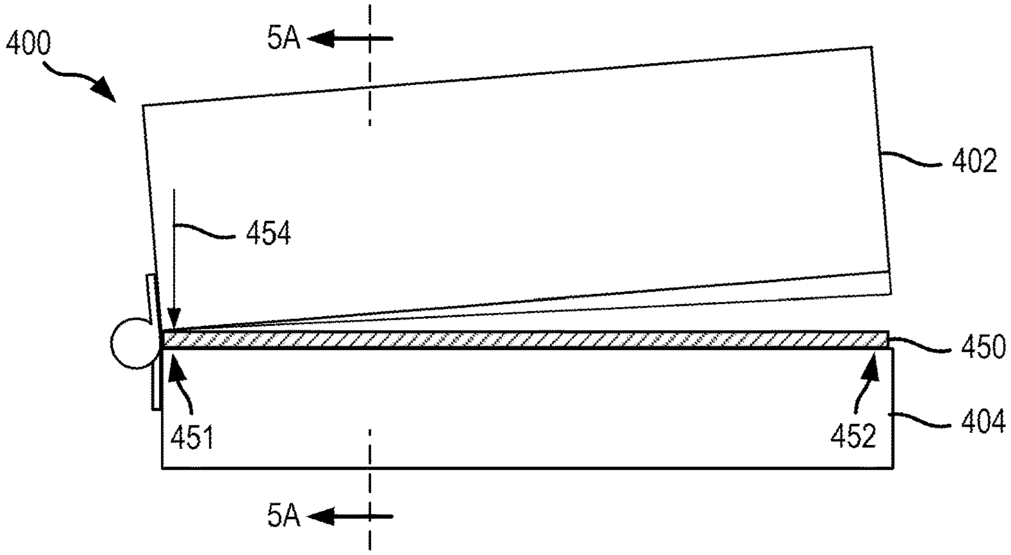
FIG. 4A, FIG. 4B, and FIG. 4C are schematic illustrations of the shape-forming of a fiber preform, in accordance with various embodiments.
Figure 4B:
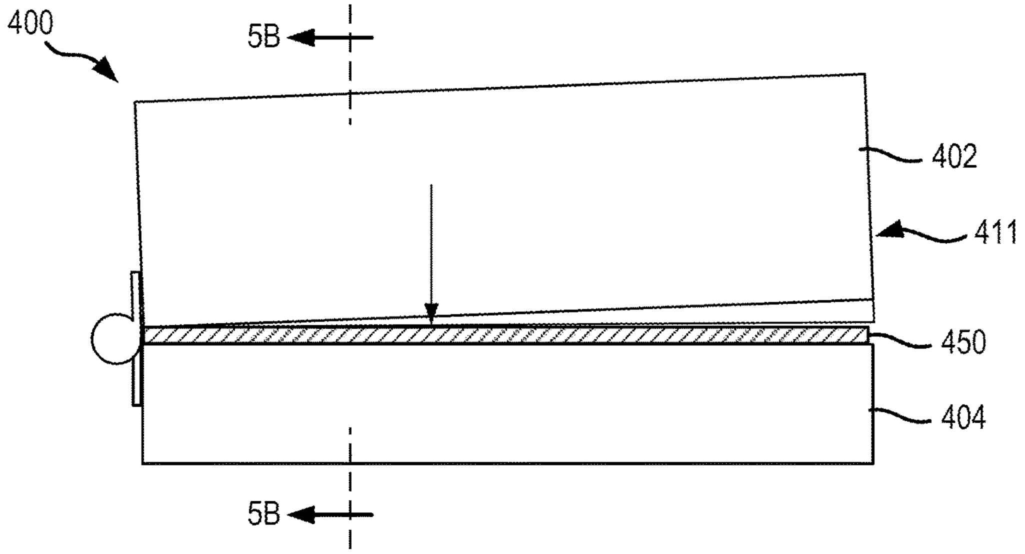
Figure 4C:
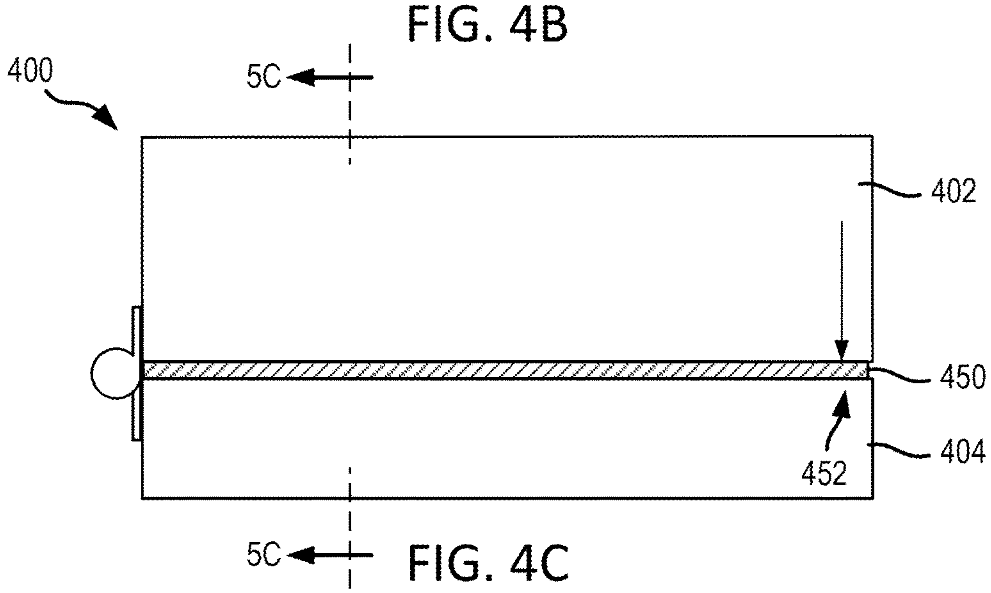

With reference to FIG. 4A through FIG. 4C, a schematic view of a shape forming fixture 400 moving from an open position to a closed position to compress a fiber preform 450 therebetween is illustrated, in accordance with various embodiments. The shape forming fixture 400 can be similar to the shape forming fixture 100 of FIG. 1A through FIG. 1C, in accordance with various embodiments. As the first forming mold 402 rotates toward the second forming mold 404, the first forming mold 402 can progressively apply pressure to the fiber preform 450 from a first side 451 of the fiber preform 450 toward a second side 452 of the fiber preform 450. For example, in a first partially closed position (see FIG. 4A), the hinge sides of the first forming mold 402 and the second forming mold 404 can clamp or compress the first side 451 of the fiber preform 450. The first side 451 is located at the hinge sides of the first forming mold 402 and the second forming mold 404. The periphery of the point of contact between the first forming mold 402 and the fiber preform 450 is illustrated by arrow 454. As the first forming mold 402 continues to rotate toward the second forming mold 404 (see FIG. 4B), the point of contact periphery 454 progressively moves toward the free side 411 of the first forming mold 402. The first forming mold 402 can continue to rotate toward the closed position (see FIG. 4C) until the point of contact periphery 454 reaches the free side 411 of the first forming mold 402 and the first forming mold 402 is applying even pressure to the fiber preform 450.

Figure 5A:
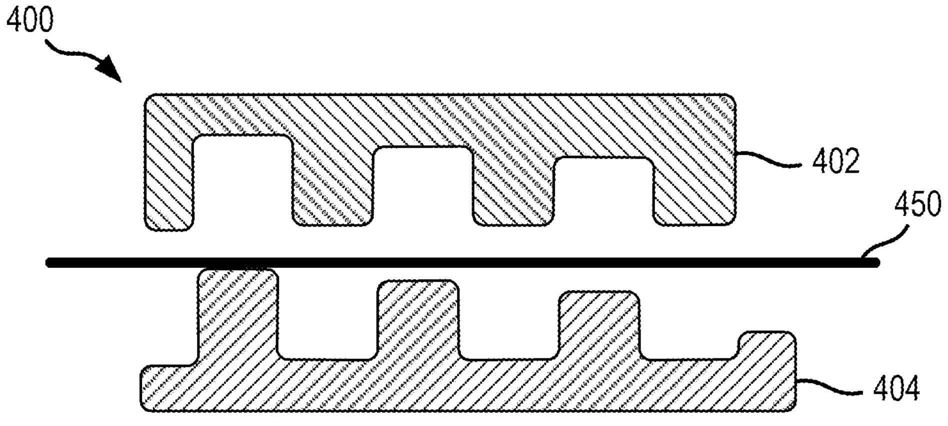
FIG. 5A, FIG. 5B, and FIG. 5C are schematic section views of the shape forming fixture of FIG. 4A, FIG. 4B, and FIG. 4C during the shape-forming process, in accordance with various embodiments.
Figure 5B:
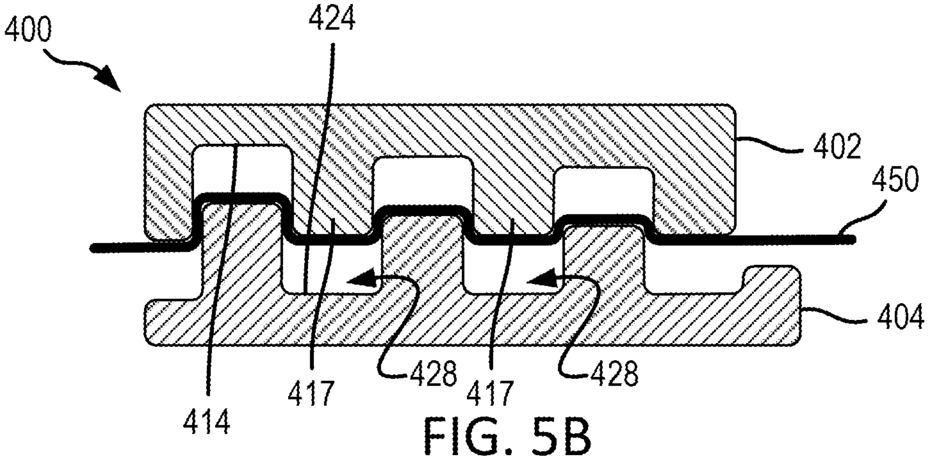
Figure 5C:
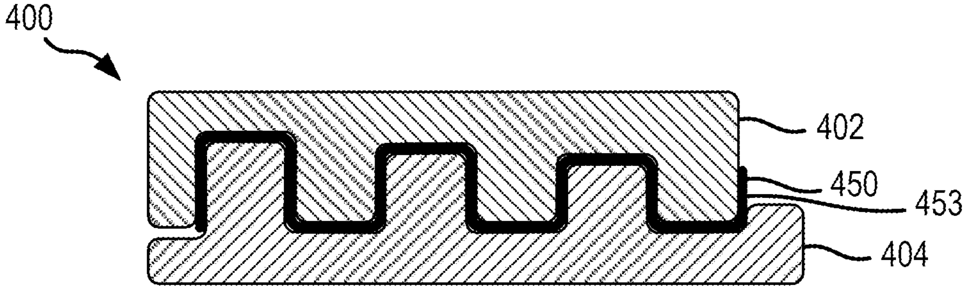

With reference to FIG. 5A through FIG. 5C, a schematic section view of the shape forming fixture 400 moving from an open position to a closed position to compress the fiber preform 450 therebetween is illustrated, in accordance with various embodiments. The fiber preform 450 can initially be a substantially planar preform sheet of fibrous material that is draped over the second forming mold 404. With particular focus on FIG. 5B, as the first forming mold 402 pivots toward the second forming mold 404, the elongated protrusions 417 of the first forming mold 402 can push the fiber preform 450 into the elongated grooves 428 of the second forming mold 404. With particular focus on FIG. 5C, as the shape forming fixture 400 reaches the closed position (FIG. 5C) the fiber preform 450 can be fully seated in the elongated grooves 428 and compressed between the first forming mold 402 and the second forming mold 404. The fiber preform 450 can thus conform to a profile of the first forming mold 402 and the second forming mold 404. In this manner, the shape of the elongated protrusions 417 can be complementary to the shape of the elongated grooves 428. In various embodiments, in the contact surface of the first forming mold 402 is parallel to the contact surface of the second forming mold 404 when the shape forming fixture 400 is in the closed position so as to apply even pressure to the fiber preform 450 (assuming the desired shaped body has a uniform thickness).

Figure 6B:
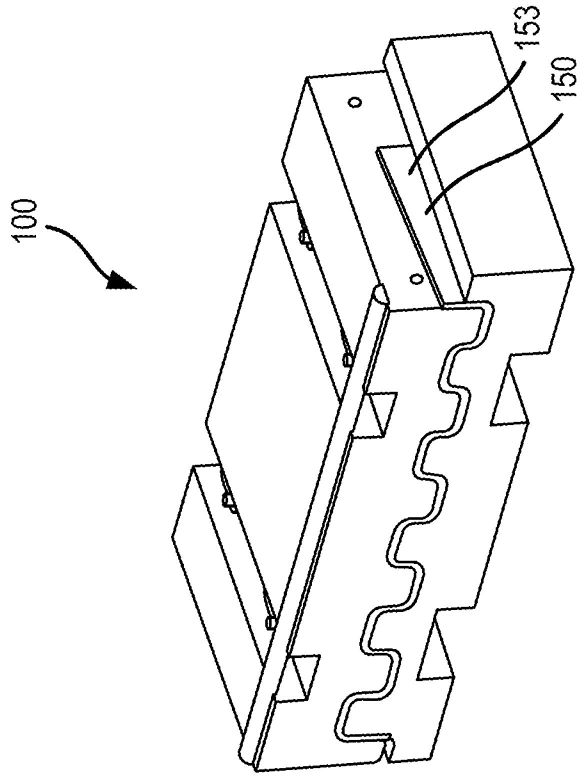
FIG. 6A and FIG. 6B are perspective illustrations of the shape forming fixture in a partially open position and a closed position, respectively, with a shape-formed fiber preform installed therein, in accordance with various embodiments.
Figure 6A:
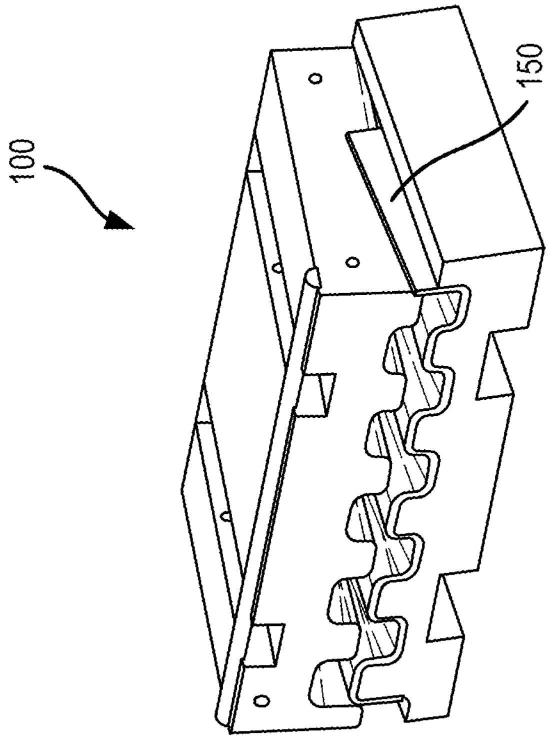

With reference to FIG. 6A and FIG. 6B, a perspective view of the shape forming fixture 100 in a partially open position and a closed position, respectively, with a fiber preform 150 formed into a shaped body and installed therein is illustrated, in accordance with various embodiments. In various embodiments, a periphery 153 of the fiber preform 150 can extend from between the first forming mold 102 and the second forming mold 104 when the shape forming fixture 100 is closed and the fiber preform 150 has been formed into the desired shaped body, which can form part of the final shaped body or can be trimmed away to form the final part, as desired.

Figure 7:
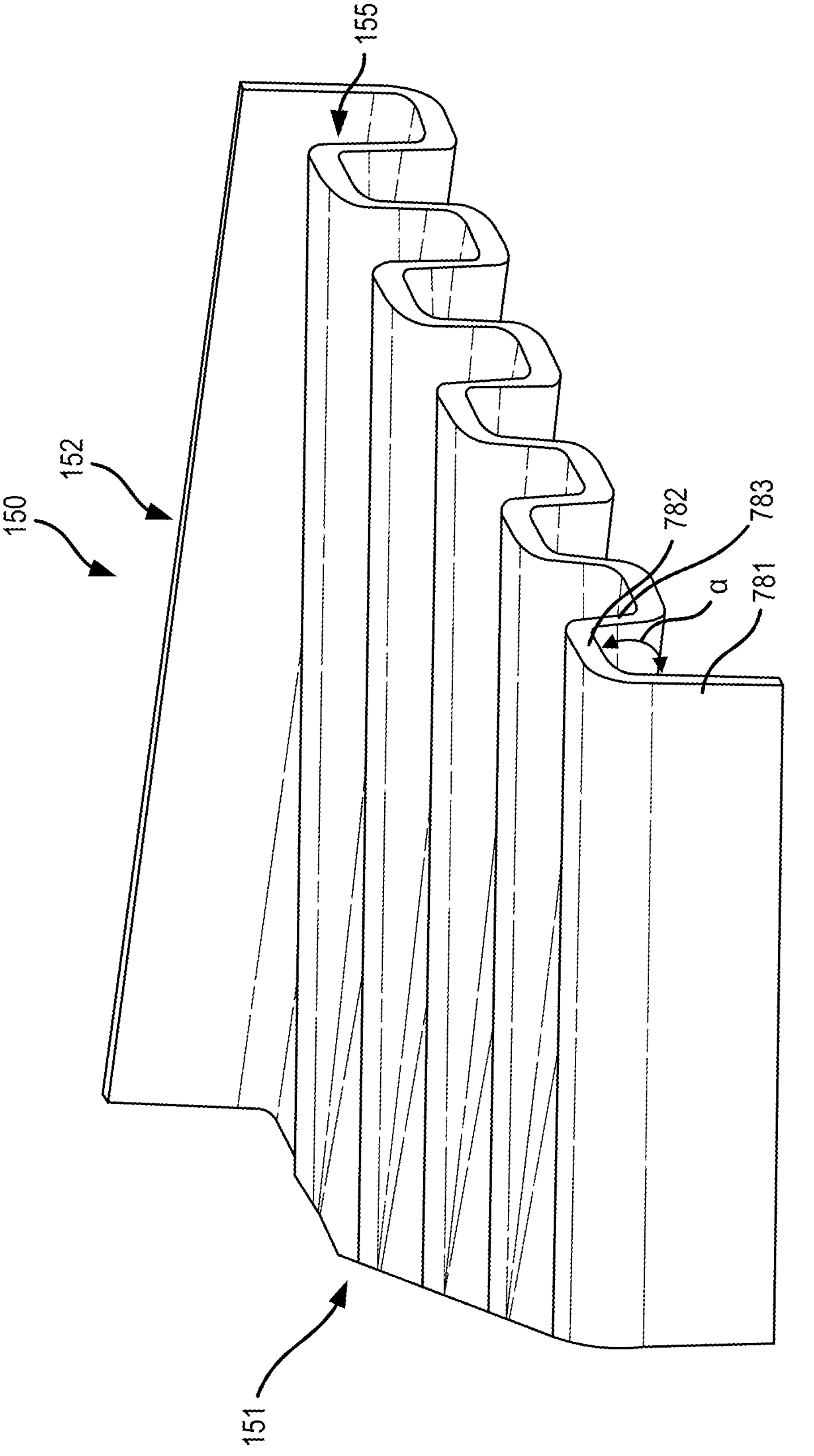
FIG. 7 is a perspective illustration of a shape-formed fiber preform, in accordance with various embodiments.

FIG. 7 is a perspective view of the fiber preform 150 after it has been formed into a shaped body 152. The shaped body 152 can include a plurality of undulations 155 which can be similar in shape to the undulations 115 and/or undulations 125 of the first forming mold 102 and the second forming mold 104, respectively. The undulations 125 can converge toward the first side 151 of the shaped body 152.

A shape forming fixture of the present disclosure may form the fiber preform 150 into a final, or near final, shape of a desired composite and/or C/C part. For example, the shaped body 152 can have a first portion 781 bent at an angle α with respect to a second portion 782 is illustrated, in accordance with various embodiments. In various embodiments, angle α is between one degree and one hundred and seventy-nine degrees (1°-179°), between five degrees and one hundred and seventy-nine degrees (5°-179°), between thirty degrees and one hundred and seventy degrees (30°-170°), between thirty degrees and one hundred and twenty degrees (30°-120°), between forty-five degrees and one hundred and seventy degrees (45°-170°), between sixty degrees and one hundred and seventy degrees (60°-170°), between ninety degrees and one hundred and seventy degrees (90°-170°), between forty-five degrees and one hundred and thirty-five degrees (45°-135°), or between eighty degrees and one hundred degrees (80°-100°). The angle α is generally chosen based on the shape of the desired composite part. The shape-formed fiber preform 150 may further comprise additional portions (such as a third portion 783). The first portion 781, second portion 782, and third portion 783 can collectively form a substantially U-shaped elongated structure. In this manner, the shape-formed fiber preform 150 may have two or more angles and/or curved surfaces in more than one plane.

Figure 8A:
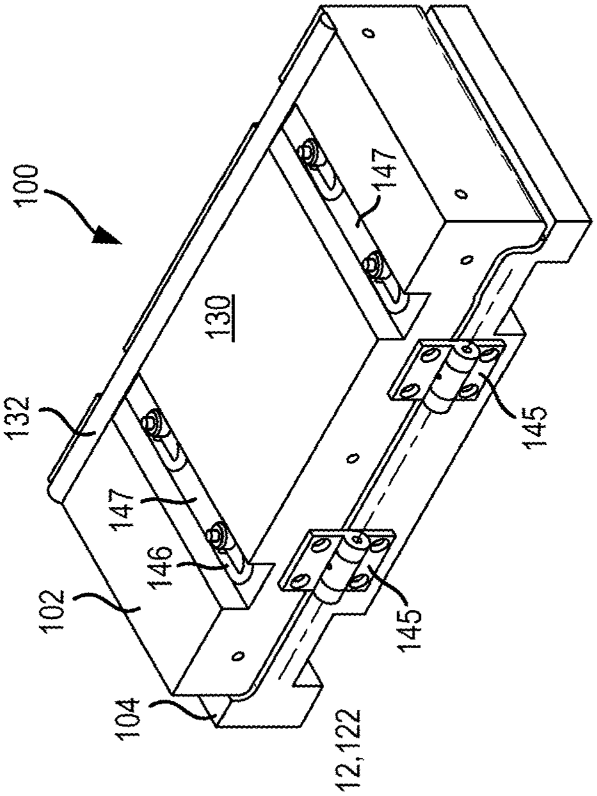
FIG. 8A, FIG. 8B, and FIG. 8C are perspective, top, and rear views of the shape forming fixture of FIG. 1A, in accordance with various embodiments.
Figure 8B:
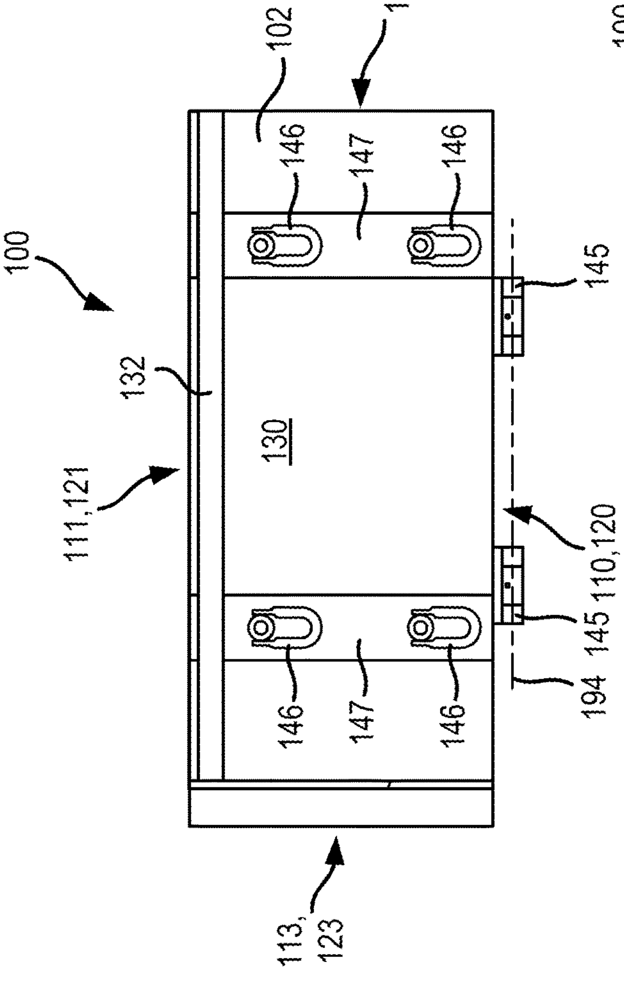
Figure 8C:
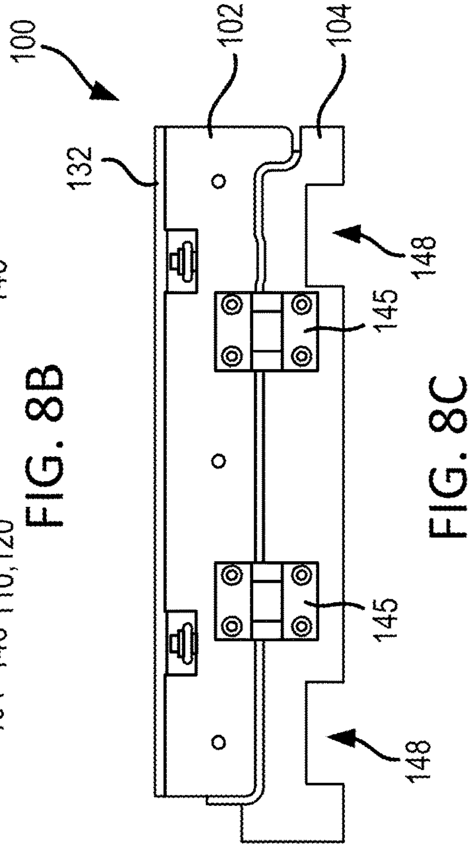

FIG. 8A, FIG. 8B, and FIG. 8C are perspective, top, and rear views of the shape forming fixture 100 in the closed position, in accordance with various embodiments. With respect to FIG. 8A through FIG. 8C, elements with like element numbering, as depicted in FIG. 1A through FIG. 1C, are intended to be the same and will not necessarily be repeated for the sake of clarity. The first forming mold 102 is pivotally coupled to the second forming mold 104 via one or more hinges 145, for example a first hinge 145 and a second hinge 145. The hinge 145 can be a butt hinge, a ball bearing hinge, a barrel hinge, or any other suitable hinge. The hinge 145 can be mounted to the hinge sides 110, 120 of the first and second forming molds 102, 104, respectively. The hinge(s) can define an axis of rotation 194.

In various embodiments, a plurality of attachment features 146 (e.g., shackles or the like) can be mounted to the outer surface 130 of the first forming mold 102 for lifting the first forming mold 102, for example to open the first forming mold 102 and/or to move the first forming mold 102 and/or the shape forming fixture 100 from one location to another. The attachment features 146 can be located within a recess 147 disposed in the outer surface 130 so that the attachment features 146 do not protrude from the outer surface 130 during the shape forming process. This can ensure the convex feature 132 is the topmost surface of the shape forming fixture 100 so that the press (see FIG. 3) contacts only the convex feature 132 as the compressing force is applied to the shape forming fixture 100.

In various embodiments, a pair of channels 148 are formed in a bottom surface of the second forming mold 104 for receiving a lifting tool (e.g., industrial truck forks or the like) for moving the second forming mold 104 and/or the shape forming fixture 100 from one location to another.

With reference again to FIG. 7, in various embodiments, and particularly for OPF preforms, the shaped body 152 can be further processed to form a C/C part. In general, there are different methods of manufacturing C/C materials. Various methods involve the layup and cure of a carbon fiber, phenolic resin matrix composite, followed by pyrolysis and subsequent phenolic resin infiltration and pyrolysis cycles. Multiple resin infiltration, cure, and pyrolysis cycles are typically used until the part achieves the desired density. Various methods involve fabrication of an OPF or carbon fiber preform, followed by carbonization (for OPF preforms) and chemical vapor infiltration (CVI) densification and/or a chemical vapor deposition (CVD) densification. The chemical vapor infiltration cycles are continued, in conjunction with machining the preform between infiltration cycles if desired, until the desired part density is achieved. Combinations of these basic process methods are also in use and may include variations in preform architecture, infiltration resin type, and chemical vapor infiltration conditions. Various methods may involve a combination of the aforementioned processes including layup and cure of a carbon fiber, phenolic resin matrix composite, followed by pyrolysis, and CVI/CVD densification.

As used herein, the term "CVI/CVD" refers to chemical vapor infiltration and/or chemical vapor deposition. Accordingly, CVI/CVD may refer to chemical vapor infiltration or deposition or both.

As used herein, "fiber volume ratio" means the ratio of the volume of the fibers of the fiber preform to the total volume of the fiber preform. For example, a fiber volume ratio of 25% means the volume of the fibers in the fiber preform is 25% of the total volume of fiber preform.

After an OPF fiber preform is shape-formed, it can be carbonized to convert the OPF into carbon fibers. Typically, fiber preforms are carbonized by placing the preforms in a furnace with an inert atmosphere. As is well-understood, the heat of the furnace causes a chemical conversion which drives off the non-carbon chemical species from the preform. The resulting preform generally has the same fibrous structure as the fiber preform before carbonizing. However, the OPF have been converted to 100%, or nearly 100%, carbon. After the preform has been carbonized, the preform is densified. In general, densification involves filling the voids, or pores, of the fiber preform with additional carbon material. This may be done using the same furnace used for carbonization or a different furnace. Typically, chemical vapor infiltration and deposition ("CVI/CVD") techniques are used to densify the porous fiber preform with a carbon matrix. This commonly involves heating the furnace and the carbonized preforms, and flowing hydrocarbon gases into the furnace and around and through the fiber preforms. As a result, carbon from the hydrocarbon gases separates from the gases and is deposited on and within the fiber preforms. When the densification step is completed, the resulting C/C part has a carbon fiber structure with a carbon matrix infiltrating the fiber structure, thereby deriving the name "carbon/carbon".

Carbon/carbon parts ("C/C") of the present disclosure are formed using multi-axial, non-crimp, OPF fabrics that are shape-formed prior to carbonization. Carbon/carbon parts ("C/C") of the present disclosure may be particularly useful for high temperature aerospace applications, such as for re-entry vehicle applications or other high temperature applications such as where a hot gas impinges on the vehicle after being rapidly compressed and heated as a result of a high pressure bow shock in front of the vehicle. C/C parts of the present disclosure may be especially useful in these applications because of the superior high temperature characteristics of C/C material. In particular, the carbon/carbon material used in C/C parts is a good conductor of heat and is able to dissipate heat generated during high temperature conditions. Carbon/carbon material is also highly resistant to heat damage, and thus, may be capable of sustaining forces during severe conditions without mechanical failure.

In various embodiments, the fiber preform 150 can include a plurality of sheets of fabric stacked together. The sheets of fabric may all be oriented in a common direction so that their respective plurality of fibers are commonly oriented, or may be alternatingly rotated so that their respective plurality of fibers extend in different direction in a crisscross pattern. The fiber preform 150 may include one or more layers of a non-woven fabric, one or more layers of a woven fabric (e.g., plain weave, 5-harness satin weave, 8-harness satin weave, etc.), or combinations thereof. The fiber preform 150 may include PAN or OPF fibers extending in three directions and leaving a plurality of pores or open spaces and may be prepared for shape-forming, compression, and carbonization. In various embodiments, fiber preform 150 is formed by stacking layers of PAN or OPF fibers and superimposing the layers (e.g., by stacking sheets of fabric). The layers may be needled perpendicularly to each other (i.e., along the Z-direction) with barbed, textile needles or barbless, structuring needles. In various embodiments, the layers are needled at an angle of between 0° and 60° (e.g., 0°, 30°, 45°, and/or 60°) with respect to the Z-direction to each other. The needling process generates a series of z-fibers through fiber preform 150 that extend perpendicularly to the fibrous layers. The z-fibers are generated through the action of the needles pushing fibers from within the layer (x-y or in-plane) and reorienting them in the z-direction (through-thickness). Needling of the fiber preform may be done as one or more layers are added to the stack or may be done after the entire stack of layers is formed. The needles may also penetrate through only a portion of fiber preform 150, or may penetrate through the entire fiber preform 150. In addition, resins are sometimes added to fiber preform 150 by either injecting the resin into the preform following construction or coating the fibers or layers prior to forming the fiber preform 150. The needling process may take into account needling parameters optimized to maintain fiber orientation, minimize in-plane fiber damage, and maintain target interlaminar properties.

After needling the fiber preform 150, the fiber preform 150 may be both compressed to higher fiber volume ratio and formed to shape in a single-step shape-forming process; though it is also contemplated that in various embodiments the fiber preform 150 is compressed and shape formed without undergoing the needling process.

Figure 9:
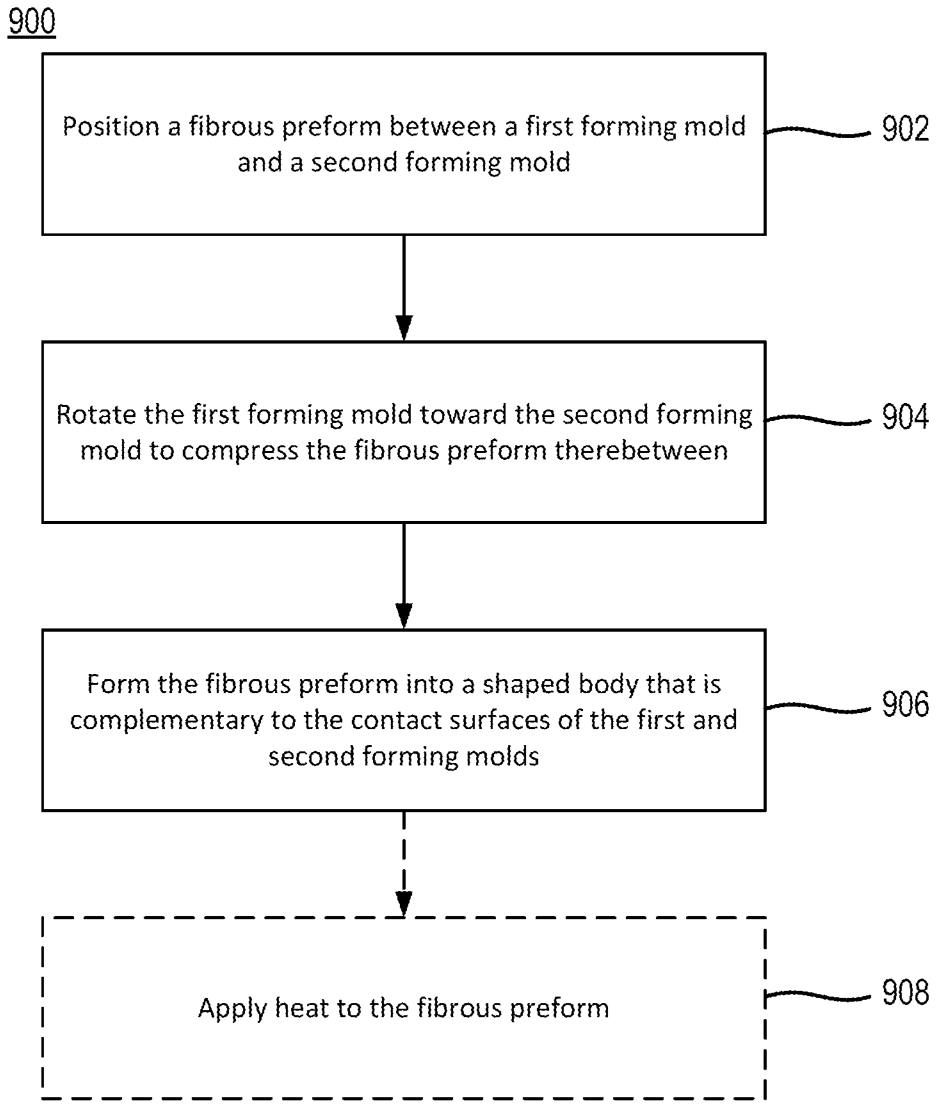
FIG. 9 illustrates a flow chart for a method for shape forming a composite part, in accordance with various embodiments.

With reference to FIG. 9, a flow diagram of a method 900 for manufacturing a C/C part is provided, in accordance with various embodiments. For ease of description, the method 900 is described below with reference to FIG. 4A through FIG. 5C. The method 900 of the present disclosure, however, is not limited to use of the exemplary shape forming fixture 400 of FIG. 4A through FIG. 5C.

In step 902, the fiber preform 150 is disposed between a first forming mold 402 and a second forming mold 404.

In step 904, the first forming mold 402 is rotated toward the second forming mold 404 to compress the fiber preform 150 therebetween.

In step 906, as the first forming mold 402 is rotated toward the second forming mold 404 (ultimately reaching a closed position), the fiber preform is formed into a shaped body 453 that is complementary to the contact surfaces 414, 424, respectively, of the first forming mold 402 and the second forming mold 404. A force can be applied to the free side of the first forming mold 402 (e.g., via the convex feature 332, see FIG. 3) with a platen press (e.g., the press 340, see FIG. 3) to hold the shaped body 453 in compression.

In step 908, the method 900 can further include applying heat to the fiber preform 450. In various embodiments, the heat is applied to the fiber preform 450 while the fiber preform 450 is held in compression in the shape forming fixture 400. In various embodiments, the heat is applied for a predetermined duration at a predetermined temperature. Step 908 can be performed while the shape forming fixture 400 is held in compression by a heated platen press, such as the press 340 of FIG. 3. In various embodiments, the fiber preform 450 is preheated before being shape formed. In various embodiments, the fiber preform 450 is heated during forming. In various embodiments, the fiber preform 450 is heated while holding compression. In this regard, the heat can be applied at any stage of the forming process and/or before the forming process.

The shape forming fixture 100 and its components 102, 104 are described above using the terms "bottom" and "top" with reference to exemplary orientations in the drawings. The present disclosure, however, is not limited to any particular formation system orientations. For example, in other embodiments, the first forming mold 102 may alternatively be configured as a bottom mold and the second forming mold 104 may alternatively be configured as a top mold.

Systems and methods are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for shape forming a composite part, the method comprising:

positioning an oxidized PAN fiber preform between a first forming mold of a shape forming fixture and a second forming mold of the shape forming fixture, the first forming mold is pivotally coupled to the second forming mold;

rotating the first forming mold toward the second forming mold to compress the oxidized PAN fiber preform therebetween; and forming the oxidized PAN fiber preform into a shaped body as the first forming mold is rotated toward the second forming mold;

wherein:

the first forming mold comprises a first plurality of undulations defining a first contact surface of the first forming mold, the first plurality of undulations converge toward a hinge side of the first forming mold, and the first contact surface defines a flat surface disposed between the hinge side of the first forming mold and the first plurality of undulations;

the second forming mold comprises a second plurality of undulations defining a second contact surface of the second forming mold, the second plurality of undulations converge toward a hinge side of the second forming mold, the second contact surface defines a second flat surface disposed between the hinge side of the second forming mold and the second plurality of undulations, and the second plurality of undulations are configured to interlock with the first plurality of undulations, and the shape forming fixture further comprises a hinge, whereby the first forming mold is pivotally coupled to the second forming mold.

2. The method of claim 1, wherein the first forming mold progressively applies pressure to the oxidized PAN fiber preform from a first end of the oxidized PAN fiber preform toward a second end of the oxidized PAN fiber preform as the first forming mold rotates toward the second forming mold.

3. The method of claim 1, further comprising heating the oxidized PAN fiber preform for a predetermined duration.

4. The method of claim 1, wherein, in response to rotating the first forming mold toward the second forming mold:

the hinge side of the first forming mold clamps a first side of the oxidized PAN fiber preform to the hinge side of the second forming mold; and a free side of the first forming mold pushes a second side of the oxidized PAN fiber preform to bend around a radii surface of the second forming mold.

5. The method of claim 4, wherein, in response to the free side of the first forming mold pushing the second side of the oxidized PAN fiber preform to bend around the radii surface of the second forming mold, the second side of the oxidized PAN fiber preform is pushed into an elongated groove disposed in the second forming mold, wherein an elongated protrusion of the first forming mold moves into the elongated groove, and the elongated protrusion bends the oxidized PAN fiber preform to conform to a profile of the second forming mold.

6. The method of claim 5, wherein the radii surface extends from a free side of the second forming mold toward the hinge side of the second forming mold.

7. The method of claim 1, wherein the first forming mold and the second forming mold are in direct contact with the oxidized PAN fiber preform.

8. The method of claim 1, further comprising:

applying a force to a free side of the first forming mold with a platen press to hold the shaped body in compression between the first forming mold and the second forming mold; and applying a heat to the shaped body for a predetermined duration.

9. The method of claim 1, wherein the oxidized PAN fiber preform is a needled oxidized PAN fiber preform.

10. A shape forming fixture for a composite part, comprising:

a first forming mold comprising a first plurality of undulations defining a first contact surface of the first forming mold, the first plurality of undulations converge toward a hinge side of the first forming mold, and the first contact surface defines a first flat surface disposed between the hinge side of the first forming mold and the first plurality of undulations;

a second forming mold comprising a second plurality of undulations defining a second contact surface of the second forming mold, the second plurality of undulations converge toward a hinge side of the second forming mold, the second contact surface defines a second flat surface disposed between the hinge side of the second forming mold and the second plurality of undulations, and the second plurality of undulations are configured to interlock with the first plurality of undulations; and a hinge, whereby the first forming mold is pivotally coupled to the second forming mold; and the first forming mold is configured to rotate toward the second forming mold to compress a fiber preform therebetween for shape forming the fiber preform into a shaped body.

11. The shape forming fixture of claim 10, wherein the first plurality of undulations extend from a free side of the first forming mold and the second plurality of undulations extend from a free side of the second forming mold.

12. The shape forming fixture of claim 10, further comprising a convex feature disposed on an outer surface of the first forming mold, opposite the first contact surface, and located at a free side of the first forming mold, and the convex feature is configured to transfer a compressing force into the first forming mold to compress the fiber preform between the first forming mold and the second forming mold.

13. The shape forming fixture of claim 12, wherein the convex feature includes at least one of:

a hemispherical body protruding from the outer surface of the first forming mold; or a rounded rod extending substantially parallel to a hinge line of the hinge.

14. The shape forming fixture of claim 10, wherein each undulation of the first plurality of undulations comprises a generally U-shaped elongated structure including two side surfaces and a surface extending between the two side surfaces.

15. The shape forming fixture of claim 14, wherein each undulation of the first plurality of undulations defines one or more radii surfaces that extend from a free side of the first forming mold toward the hinge side of the first forming mold.

16. The shape forming fixture of claim 10, wherein the second plurality of undulations defines one or more elongated protrusions and one or more elongated grooves, each of the elongated grooves being interposed between adjacent elongated protrusions.

17. The shape forming fixture of claim 16, wherein the elongated protrusions are configured without any sharp corners or sharp transitions.

18. The shape forming fixture of claim 10, wherein a depth of the first plurality of undulations monotonically decreases from a free side of the first forming mold toward the hinge side of the first forming mold.

19. The shape forming fixture of claim 10, wherein the hinge comprises at least one of a butt hinge, a ball bearing hinge, or a barrel hinge.

20. The shape forming fixture of claim 10, further comprising at least one of:

a plurality of attachment features disposed in a recess in an outer surface of the first forming mold, the attachment features configured for lifting the first forming mold; or a pair of channels formed in a bottom surface of the second forming mold for receiving a lifting tool.

* * * * *